Dec. 2, 1952 — W. F. BAIRD — 2,619,808
ICE-CREAM FREEZER
Filed Jan. 17, 1946 — 2 SHEETS—SHEET 1

INVENTOR.
William F. Baird.
BY

Dec. 2, 1952 W. F. BAIRD 2,619,808
ICE-CREAM FREEZER
Filed Jan. 17, 1946 2 SHEETS—SHEET 2
Fig. 3.
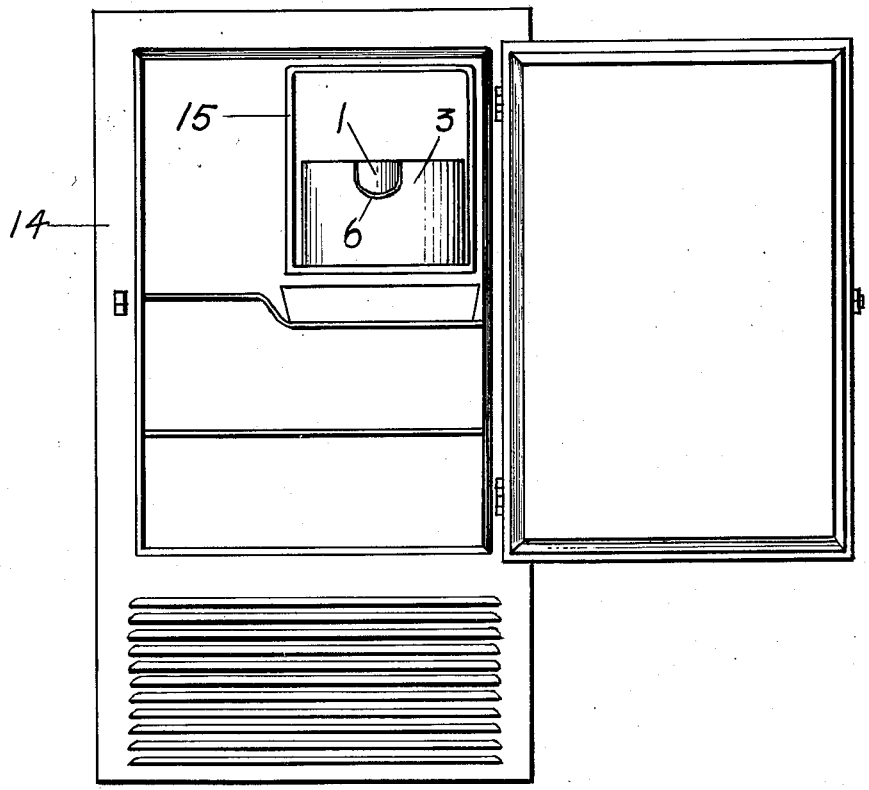
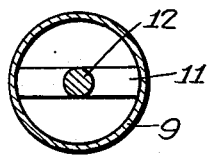
FIG. 4.
INVENTOR.
William F. Baird
BY Patented Dec. 2, 1952

2,619,808

UNITED STATES PATENT OFFICE 2,619,808

ICE-CREAM FREEZER

William F. Baird, Los Angeles, Calif.

Application January 17, 1946, Serial No. 641,677

5 Claims. (Cl. 62—114)

This invention relates to improvements in methods of and means for making ice cream, frozen custard, sherbets, frappés, and other frozen products.

It is the principal object of this invention to provide methods of and means for preparing ice cream, frozen custard, etc. in small lots.

Prior to freezing, the material for making ice cream, frozen custard, etc. may consist of a mixture of milk, cream, eggs, sugar flavoring extract, water, etc. mixed and sometimes cooked together. This mixture, commonly called "mix," is thus an emulsion of butter-fat and other colloidally dispersed materials in a water solution of sugar, milk sugar, milk salts, flavoring extracts and other water-soluble ingredients. The presence of the water-soluble ingredients lowers the freezing point of the water, but when the temperature of the mix is sufficiently reduced crystal of pure ice begin to form. Pure ice crystals are hard and tasteless and if allowed to grow large enough to become perceptible they detract from the smoothness of texture of the ice cream and render it granular, "sandy," and unpalatable.

Other things being equal, the size of such crystals depends upon the length of time the mix is held at temperatures just below that at which it begins to freeze, at which temperature water molecules can migrate to positions in the ice-crystal lattic more rapidly than is possible after viscosity has been increased by further temperature lowering. Therefore an obvious means of preventing the growth of large crystals in the freezing of mix is to cool it as rapidly as possible, and since its thermal conductivity is very poor, rapid cooling is practically impossible without agitation. In the large-scale commercial production of ice cream, mix is introduced into a cylinder the walls of which are maintained at a low temperature. As fast as the mix freezes against these walls it is removed by rapidly revolving scrapers and so violently stirred and intermixed with the balance of the mix that the temperature of the entire mass is lowered very rapidly and freezing occurs so quickly that crystal growth is kept at a minimum. But the housewife, with no other means of cooling than the ordinary power-operated household refrigerator has hitherto had no means of agitating the mix to accelerate cooling, and hence has found it necessary to use in the mix quantities of gelatine, corn-starch, flour and other materials which discourage the growth of large crystals by forming a gel-like structure which increases viscosity and impedes the migration of water molecules to the ice-crystal lattice. These dense, viscous gel-like materials perform the added function of rendering less noticeable any ice-crystals which may have grown large despite the increased viscosity. By the use of these additives mix can be frozen in the ice-cube trays of household refrigerators without agitation, but the process is slow, the cost of the additive substantially increases the cost of the product and the product itself is a sort of a chilled gelatine rather than true ice cream.

A further advantage of violent agitation or whipping of the mix during freezing is that air is beaten into it and thus incorporated in the ice cream. Without this included air the ice cream tends to be excessively cold in the mouth, heavy and soggy in body, coarse in texture and unpalatable.

Among the further objects of this invention, therefore, are to provide methods of and means for making ice cream, frozen custards, etc.—

(1) Of superior body, texture and palatability,
(2) Easily, conveniently, and quickly,
(3) With simple, inexpensive apparatus,
(4) Utilizing refrigeration from ordinary power-operated household refrigerators, and
(5) Without the necessity of adding to the mix any gelatine, starch or other extraneous material for checking or concealing crystal growth.

Still further objects and advantages of this invention will appear more fully hereinafter.

The principle of this invention is capable of receiving a variety of expressions, one of which, for the purpose of illustration, is shown in the accompanying drawings, wherein—

Figure 3 is an elevation of the apparatus shown in the ice-cube compartment of a household refrigerator.

Fig. 4 is a horizontal section on the line 3—3 of Figure 1.

Figure 1:
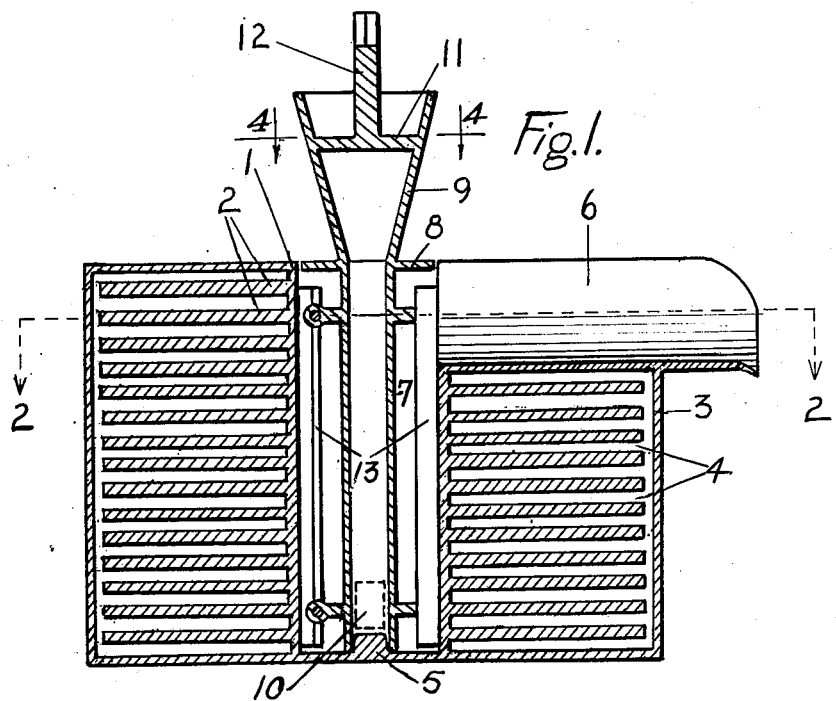
Figure 1 is a sectional view, taken in a vertical plane, of apparatus embodying the invention.
Figure 2:
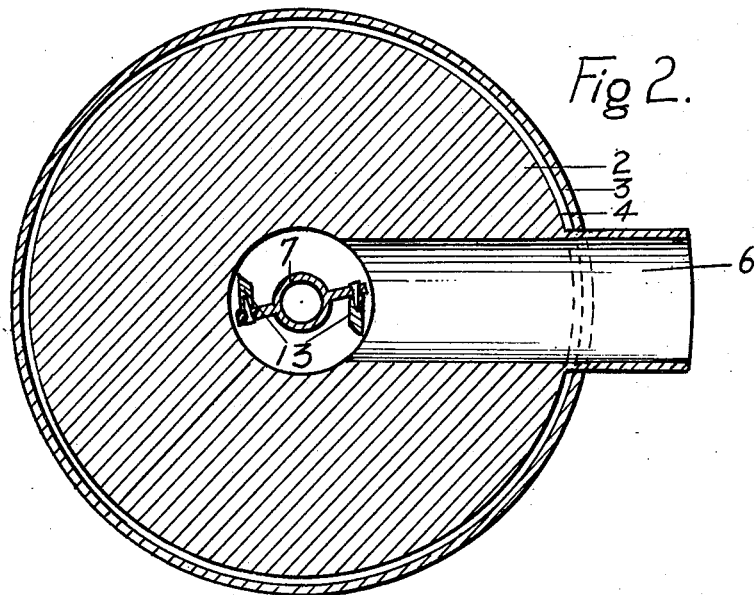
Figure 2 is a horizontal section on the line 2—2 of Figure 1.

Figures 1 and 2, wherein identical parts are designated by the same reference numbers, may be considered together for the better understanding of the description which follows. As indicated, the outside surface of the vessel or cylinder 1 is provided with the fins 2 which extend horizontally into the space enclosed by the casing 3. The vessel or cylinder 1 and the fins 2 are preferably of material having high thermal conductivity such as metals like aluminum, copper, etc. The spaces between the fins 2, together with the remainder of the space enclosed by the casing 3 is substantially filled with the freezable liquid or solution 4, leaving only enough of the enclosure vacant to accommodate the expansion of the solution 4 upon freezing, so as to avoid rupturing the walls of the apparatus. The liquid or solution 4 is wholly enclosed by and permanently sealed into the apparatus and is a substance or mixture all or a substantial portion of which freezes above the lowest temperature available in the household refrigerator with which the apparatus is to be used and below the temperature at which a substantial portion of the water in the mix can be frozen. The cylinder 1 is closed at the bottom and in the center of the bottom is the stud 5. In the upper portion of one side of the cylinder 1 there is a deep channel for the discharge of partially frozen ice cream, terminating in the spout 6.

The hollow tube 7 is centered at the bottom of the cylinder 1 by the stud 5 and at the top by the flange 8. The tube 7 is provided at the top with the funnel 9, through which mix is introduced, and at the bottom with the opening 10 through which mix flows out from the tube 7 into the cylinder 1. The bar 11 extends across the inside of the funnel 9 and supports the vertical shaft 12, which is centered over the center of the tube 7. The top of the shaft 12 is squared or otherwise adapted to engage an electrically driven household beater, a crank or other suitable driving mechanism. Attached to the tube 7 are the beater-scraper members 13, which are suspended loosely, so that when the tube 7 is rotated clockwise centrifugal force, together with the resistance offered by mix in the cylinder 1, cooperate to force the sharp edges of the beater-scraper members 13 tightly against the smooth inner wall of the cylinder 1. It will be noted that the entire apparatus consists of but two portions and that the beater-scraper assembly is readily removed from the cylinder 1 for cleaning.

Figure 3 shows an elevation of the apparatus with the beater-scraper assembly removed. In Figure 3 the apparatus is depicted in the ice-cube compartment 15 of the household refrigerator 14, of which only a portion is shown. The only parts of the apparatus visible in Figure 3 are the casing 3 and a portion of the inside of the cylinder 1 as seen through the spout 6.

The operation of the apparatus heretofore illustrated and described is as follows—The beater-scraper assembly is removed from the cylinder 1 before freezing the solution 4 to avoid excessive cooling, which may cause mix to freeze in and clog the tube 7. After the beater-scraper assembly has been removed, the apparatus is placed in the ice-cube compartment 15 of the refrigerator 14 wherein the solution 4 is wholly or largely frozen. The apparatus is then removed from the refrigerator; the beater-scraper assembly is replaced in the cylinder 1; and electrically operated household beater or other driving mechanism is engaged with the shaft 12 and the beater-scraper mechanism is maintained in rapid clockwise rotation. The optimum rate of rotation may vary with the size and design of the apparatus, the freezing point of the solution 4, the freezing and other characteristics of the mix and the extent to which air is to be beaten into the product, but a speed of about three hundred and fifty revolutions per minute has been found satisfactory.

While the tube 7 and the parts attached to it are thus maintained in rapid clockwise rotation, mix which has previously been cooled to about forty degrees Fahrenheit is slowly poured into the rotating funnel 9, whence it flows down through the tube 7 and out through the opening 10 into the cylinder 1. Portions of the mix coming in contact with the cold wall of the cylinder 1 immediately begin to freeze and as fast as this occurs the frozen portion is scraped from the wall of the cylinder 1 by the beater-scrapers 13 and stirred back into the unfrozen portion of the mix, which is cooled by it, and by a continuation of this process the temperature of the entire mass is quickly lowered so that a substantial portion of the water in the mix is frozen so rapidly as to allow little time for the migration of water molecules to form large crystals. At the same time the removal of this part of the water by freezing, together with the reduced temperature, has so far increased the viscosity of the mix as to render further migration of water molecules negligible and appreciable crystal growth impossible. At the same time air is being beaten into the mix and incorporated into the ice cream as it freezes, rendering it light, smooth in texture and pleasing to the taste.

This beating and freezing process is continued until the product is sufficiently frozen as to be barely fluid, whereupon additional mix is poured into the funnel 9. As the newly added mix issues from the opening 10 into the bottom of the cylinder 1 the partially frozen material, being lighter, is floated upward until it is discharged from the apparatus through the spout 6. By adding mix continuously at a rate adjusted to the rate of freezing the apparatus can be made to discharge the product continuously until all of the solution 4 has been melted. The product may be consumed as discharged from the apparatus or placed in a refrigerator for more complete freezing and storage. It will be obvious that when mix is first poured into the apparatus, the time which elapses before further mix is added can be adjusted so as to increase or diminish the period during which the mix is subjected to the beating action within the cylinder 1, thus regulating the amount of air incorporated in the ice cream.

In addition to freezing characteristics adapted to the conditions under which the apparatus is to be used, the solution 4 should preferably have a high latent heat of fusion. By way of illustration, a liquid consisting of twenty percent ethylene-glycol-mono-ethyl-ether-acetate (commonly called cellosolve acetate), five percent methyl alcohol, and seventy-five percent water by weight has proven capable, in aluminum apparatus of good thermal conductivity, of being largely frozen overnight in the ice-cube compartment of an ordinary electric household refrigerator and of freezing ordinary mix rapidly to ice cream of superior body, texture and palatability. Methods of compounding solutions adapted to any specific conditions of use will be apparent to persons skilled in the art to which this invention appertains.

Clearly any space where the temperature is low enough may be used instead of a refrigerator for freezing the solution 4—indeed this freezing may be done out-of-doors in sufficiently cold weather. It is obvious that many changes can be made in the apparatus herein illustrated and described and that parts of it may be embodied in different but equivalent structures without departing from the principle of this invention or the scope of the following claims defining it.

I claim:

1. That method of making ice cream which comprises introducing mix into the lower portion of a vessel, whipping said mix while portions of it are being frozen within said vessel, and finally displacing the frozen product from said vessel by floating it upward upon subsequent increments of unfrozen mix introduced underneath it.

2. That method of controlling the amount of air incorporated in ice cream during freezing which comprises introducing the unfrozen mix into the bottom of a vertical cylinder, freezing the said mix while beating or whipping air into it within said cylinder, raising the frozen material to the upper portion of said cylinder and finally discharging it therefrom by floating it upward on further increments of unfrozen mix introduced into the bottom of said cylinder beneath it, and regulating the rate at which said further increments of unfrozen mix are introduced to control the length of time preceding lots of mix are subjected to said beating and whipping.

3. In an ice cream freezer in combination a vessel, a freezable liquid permanently sealed within a casing partially surrounding said vessel, a beater-scraper assembly in said vessel, a conduit adapted for the introduction of mix to one end of said vessel and an outlet adapted for the discharge of partially frozen mix from the other end of said vessel.

4. In an ice cream freezer in combination a vessel, a freezable liquid permanently sealed within a casing partially surrounding said vessel, a beater-scraper assembly extending into said vessel, a conduit adapted for the introduction of mix extending from an outer portion of said beater-scraper assembly to an inner portion of said vessel and an outlet adapted for the discharge of partially frozen mix from said vessel.

5. In apparatus for utilizing the refrigerating effect of a household refrigerator for freezing ice cream and the like in combination a vessel, a rotatable scraper assembly extending into said vessel, a conduit adapted for the introduction of mix extending from an outer portion of said scraper assembly to an inner portion of said vessel, an outlet adapted for the discharge of partially frozen mix from said vessel, a liquid-tight casing partially surrounding said vessel, a refrigerator having a freezing compartment adapted to receive and refrigerate said vessel and casing and a liquid partially freezable in said freezing compartment permanently sealed in said casing.

WILLIAM F. BAIRD.

REFERENCES CITED

The following references are of record in the file of this patent:

UNITED STATES PATENTS

| Number | Name | Date |
|---|---|---|
| 1,791,041 | Sawyer | Feb. 3, 1931 |
| 1,993,130 | Ballew | Mar. 5, 1933 |
| 1,978,176 | Steenstrup | Oct. 23, 1934 |
| 2,282,662 | Lindsey | May 12, 1942 |
| 2,282,862 | Genova | May 12, 1942 |
| 2,304,579 | Lindsey | Dec. 8, 1942 |
| 2,316,845 | Craft | Apr. 20, 1943 |